(12) United States Patent
Lam et al.

(10) Patent No.: US 7,791,827 B2
(45) Date of Patent: Sep. 7, 2010

(54) MINIATURE ACTUATOR AND OPTICAL APPARATUS

(75) Inventors: Sio Kuan Lam, New Territories (HK); Kwok Sing Cheng, Tuen Mun (HK); Kin Ming Fan, Ma Wan (HK); Hua Yang, Shenzhen (CN); Wing Ming Fan, Sheung Shui (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 0 days.

(21) Appl. No.: 12/332,259

(22) Filed: Dec. 10, 2008

(65) Prior Publication Data

US 2010/0142063 A1 Jun. 10, 2010

(51) Int. Cl.
*G02B 7/02* (2006.01)
(52) U.S. Cl. ....................................................... 359/824
(58) Field of Classification Search ................. 359/694, 359/696, 821–824
See application file for complete search history.

(56) References Cited

U.S. PATENT DOCUMENTS

| 7,285,879 | B2 | 10/2007 | Osaka | |
| 7,457,061 | B2 * | 11/2008 | Sata et al. | 359/824 |
| 2006/0275032 | A1 | 12/2006 | Hong et al. | |
| 2007/0047942 | A1 | 3/2007 | Chang | |
| 2007/0091199 | A1 | 4/2007 | Shiraki et al. | |
| 2008/0025164 | A1 | 1/2008 | Sata et al. | |
| 2008/0192124 | A1 | 8/2008 | Nagasaki | |
| 2008/0198254 | A1 | 8/2008 | Nagasaki | |
| 2008/0247063 | A1 | 10/2008 | Otsuki et al. | |

FOREIGN PATENT DOCUMENTS

| CN | 1465996 A | 1/2004 |
| CN | 1831576 A | 9/2006 |
| CN | 1874571 A | 12/2006 |
| CN | 2862066 Y | 1/2007 |
| CN | 101158742 A | 4/2008 |
| CN | 101236285 A | 8/2008 |
| CN | 101246248 A | 8/2008 |
| CN | 201107448 Y | 8/2008 |
| CN | 101261351 A | 9/2008 |
| CN | 2847327 Y | 12/2008 |
| EP | 1884814 A1 | 2/2008 |
| JP | 2008122705 A | 5/2008 |
| KR | 10-2004-0020818 | 3/2004 |

OTHER PUBLICATIONS

International Search Report and the written opinion of the international searching authority, or the declaration dated Oct. 1, 2009 for PCT/CN2009/070024 in 14 pages.

* cited by examiner

*Primary Examiner*—Joseph Martinez
(74) *Attorney, Agent, or Firm*—Berkeley Law & Technology Group, LLP

(57) ABSTRACT

The subject matter disclosed herein relates to an actuator to adjust a position of a lens.

10 Claims, 4 Drawing Sheets

MINIATURE ACTUATOR AND OPTICAL APPARATUS

FIELD

The subject matter disclosed herein relates to an actuator to adjust a position of a lens.

BACKGROUND

An actuator may be used to adjust a position of a lens by displacing the lens in an optical axis direction, such as for autofocusing and/or zooming operations of a camera. Such a camera may comprise a miniature camera to be employed in small-sized electronic apparatuses such as a cellular phone and/or a personal digital assistant (PDA), just to name a few examples. An actuator typically includes an electrical coil disposed within a magnetic field of a permanent magnet, for example. Such an actuator may displace a lens by virtue of an interaction between a magnetic field generated by an electrical current flowing through the coil and the magnetic field of the permanent magnet.

As the popularity of cell phone cameras and other miniature camera applications continues to increase, designers may face a challenge of providing such miniature cameras that are increasingly lightweight and more easily manufactured. Accordingly, components that may be employed in a miniature camera, such as an actuator, may provide an opportunity to realize such lighter and more easily manufactured cameras if such components themselves are lighter and more easily produced.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
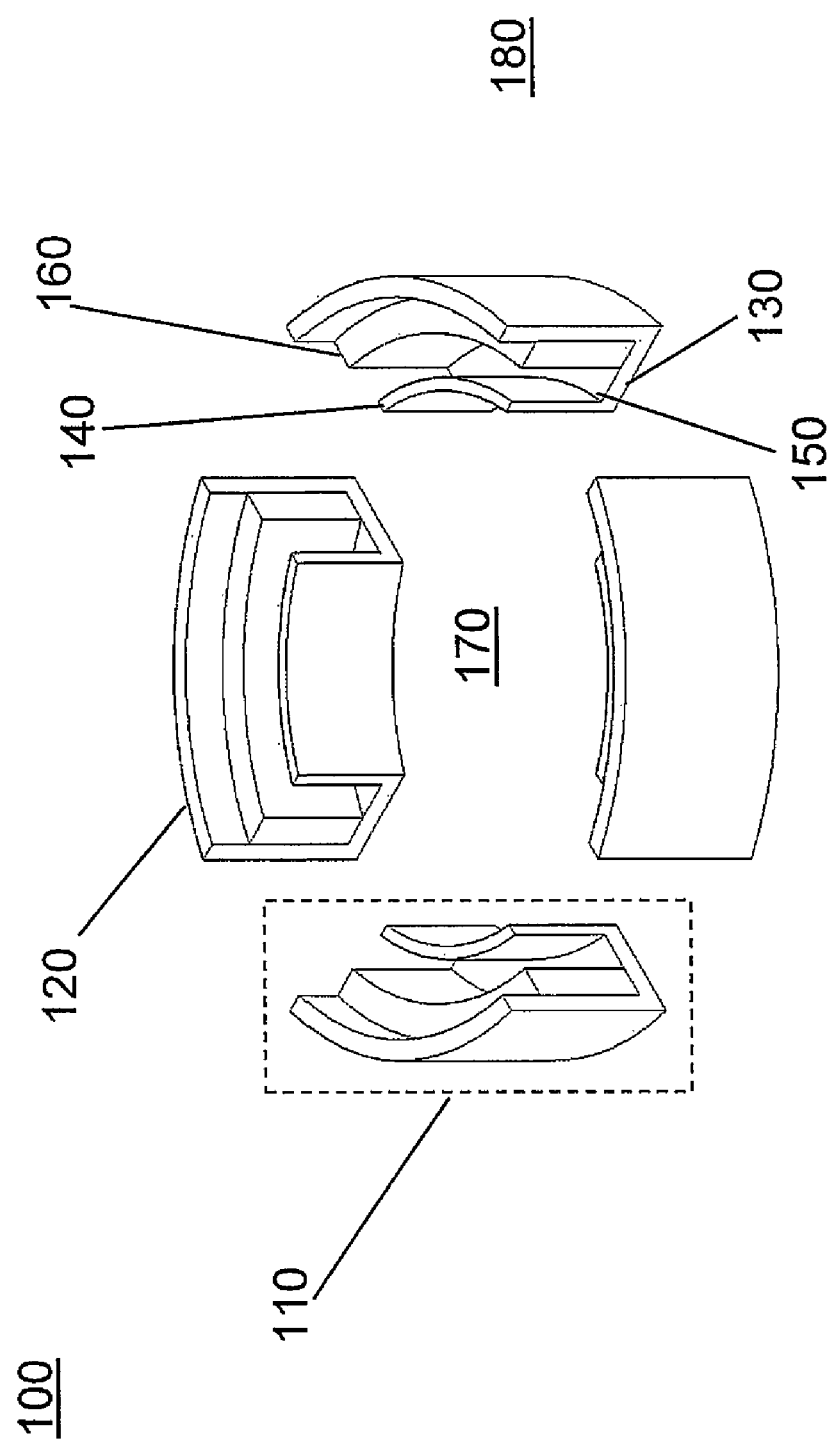
FIG. 1 is a perspective view illustrating a yoke comprising yoke sections, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

In an embodiment, an apparatus may comprise an actuation element capable of displacing and/or adjusting a position of a lens and/or a lens assembly such as a lens carrier holding a lens. Such a lens and/or lens assembly may comprise at least a partially circular circumference, such as a substantially circular shape with portions of its perimeter truncated, e.g., flattened, for example. In a particular embodiment, however, such a lens and/or lens assembly may comprise a fully circular circumference. An actuation element may include an electric coil at least partially surrounded by a yoke that may include one or more permanent magnets. In contrast to a single, one-piece yoke, an embodiment may include a yoke comprising at least two mutually non-contacting subtending yoke sections. Accordingly, such yoke sections may comprise less material, be lighter and easier to make, and/or occupy less space than a single, one-piece yoke. In a particular embodiment, such yoke sections may be substantially symmetrically disposed about a central area, which may accommodate an electric coil. For example, such yoke sections may be evenly and/or symmetrically placed along a circular perimeter so that a displacement angle between centers of yoke sections may be determined by dividing 360 degrees by the number of yoke sections, as described in detail below. In this case, two such yoke sections may be placed along a circular perimeter so their centers are separated 180 degrees from one another; three such yoke sections may be placed along a circular perimeter so their centers are separated 120 degrees from one another; four such yoke sections may be placed along a circular perimeter so their centers are separated 90 degrees from one another, and so on. Of course, such yoke positioning is merely an example, and claimed subject matter is not so limited. Yoke sections may include a channel in which a magnet may be disposed. Accordingly, such yoke sections including a magnet, if evenly and/or symmetrically placed, may provide a substantially uniform magnetic field within the actuator sections, as discussed below. Of course, yoke sections need not be evenly and/or symmetrically placed to provide such a substantially uniform magnetic since, for example, magnets placed in respective yoke sections may individually contribute differently to the total magnetic field.

Figure 2:
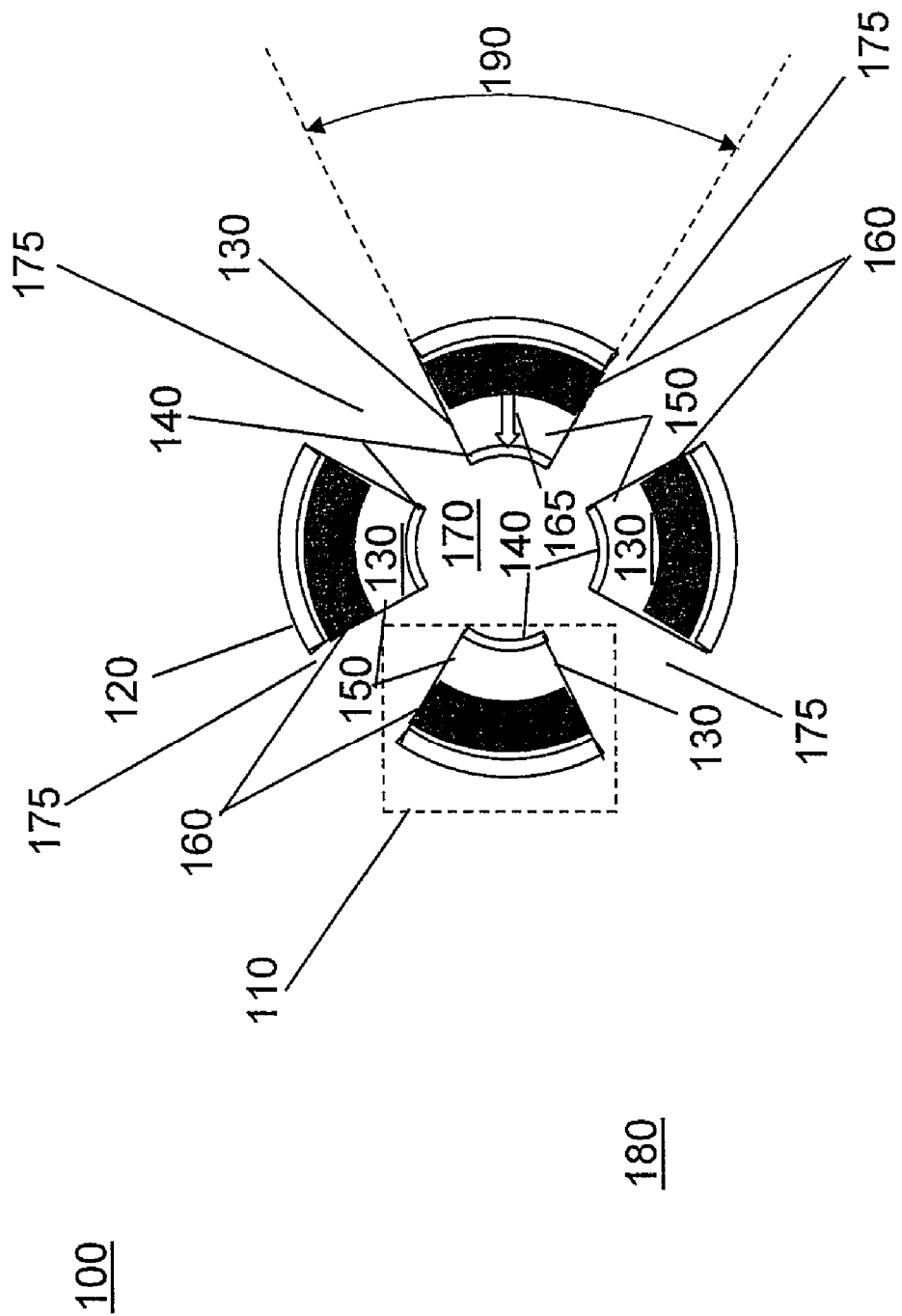
FIG. 2 is a plan view of a yoke, according to an embodiment.
Figure 3:
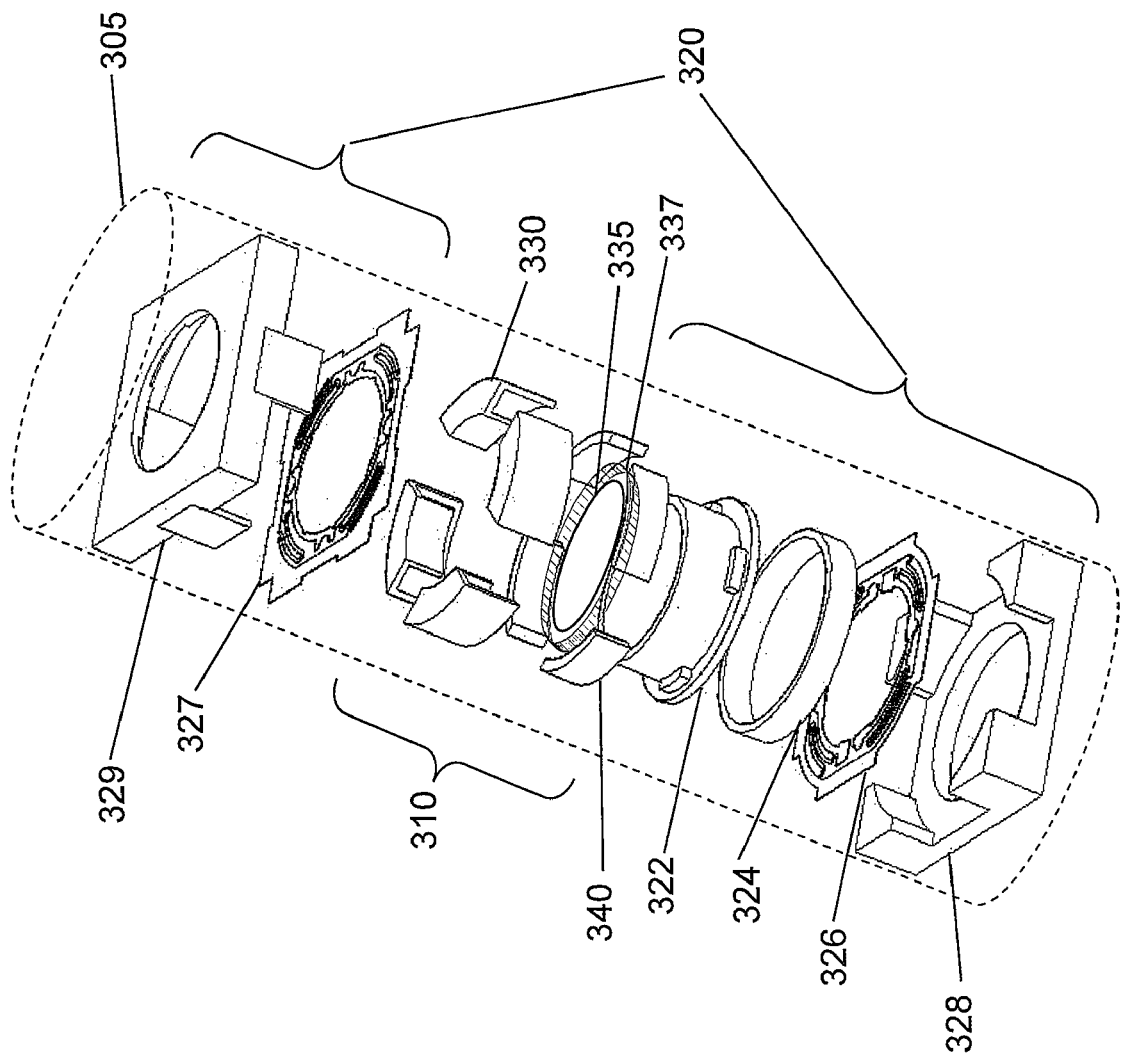
FIG. 3 is an exploded perspective view of an actuation element, according to an embodiment.

FIG. 1 is a perspective view and FIG. 2 is a plan view illustrating a yoke 100 comprising yoke sections 110 and magnets 160, according to an embodiment. Such a yoke, which may comprise a magnetically permeable material, may generate a magnetic field by virtue of magnets 160, for example. Yoke 100 may comprise at least two mutually non-contacting subtending yoke sections 110 and a section gap 175 between individual mutually non-contacting yoke sections. In the example shown in FIGS. 1 and 2, four such yoke sections are employed and are substantially symmetrically disposed about a central area 170 within the yoke sections. In a particular embodiment, central area 170 and/or channel 150 may accommodate an electric coil (e.g., as shown in FIG. 3) mechanically attached to a lens, for example, which may be adapted to move along an optical axis coincident with an axis of central area 170. Individual yoke sections 110 may comprise an outer cylindrical portion 120, an inner cylindrical portion 140, and a connecting portion 130. Outer cylindrical portion 120 and inner cylindrical portion 140 may collectively form channel 150, which may comprise a gap adapted to accommodate at least a portion of an electric coil and/or a magnet 160, such as a permanent magnet, for example. Such a gap may provide a size tolerance to allow magnet 160 having size variations to fit in the gap along with at least a portion of an electric coil. In a particular embodiment, a distance across channel 150 from magnet 160 to inner cylindrical portion 140 may include the range 0.2 mm to 3.0 mm, for example. An adhesive may be employed to securely fix magnet 160 in channel 150. Outer cylindrical portion 120, inner cylindrical portion 140, and connecting portion 130 may comprise a magnetic material, such as iron whose surface is plated with nickel, and/or a magnetically permeable material, for example. Of course, such materials are merely examples, and claimed subject matter is not so limited. In a particular implementation, a connecting portion 130 need not be included and outer cylindrical portion 120, inner cylindrical portion 140, and magnet 160 may be mechanically fixed to one another by other means. For example, an adhesive (not shown) may be employed to fix outer cylindrical portion 120 to magnet 160 and to fix inner cylindrical portion 140 to magnet 160.

As mentioned above, yoke sections 110 may be substantially symmetrically disposed about a central area 170. Such yoke sections, in a particular embodiment, may extend along a circular perimeter substantially centered in central area 170. As shown in FIG. 2, individual yoke sections 110 may extend over an angular sector 190. Accommodating a feature that yoke sections 110 are mutually non-contacting and separated by section gap 175, angular sector 190 may comprise an angle less than a value determined by dividing 360 degrees by the number of yoke sections. For example, angular sector 190 may comprise an angle less than 90 degrees if four yoke sections are employed, as in FIG. 2. Such an angle may include 10, 20, 30, 45, 60, or 75 degrees, just to name a few examples of angles less than 90 degrees. Accordingly, the sum of angles of all section gaps 175 between all yoke sections 110, which may or may not be equal to one another, plus the sum of all angles subtended by yoke sections 110 may be less than or equal to 360 degrees. Of course, such angles and configurations are merely examples, and claimed subject matter is not so limited.

In an embodiment, yoke sections 110 may comprise a magnetically permeable material that is bendable, for example. Accordingly, yoke sections 110 may be produced by bending flat stock material and cutting to a desired length. Such flat stock, for example, may comprise a channel material with a cross-section that substantially corresponds to outer and inner cylindrical portions 120 and 140 and connecting portion 130 of yoke sections 110. Producing yoke sections in such a manner may be relatively easy compared to producing yoke sections by a tooling and molding process, for example.

As discussed above, magnets 160 in conjunction with yoke sections 110 may generate a magnetic field in an area within the yoke sections, such as channel 150. A corresponding magnetic field in an inner region 170 and an outer region 180 may be relatively small. Magnets 160 may comprise permanent magnets made of neodymium, for example, though claimed subject matter is not limited to such an example. Magnets 160 may include curved inner and outer surfaces to conform to inner and outer cylindrical portions 140 and 120 of the yoke sections 110. In a particular implementation, the outer curved surface of magnet 160 may be mechanically in contact with outer cylindrical portion 120. In another particular implementation, the inner curved surface of magnet 160 may be mechanically in contact with inner cylindrical portion 140, resulting in a channel (not shown) between magnet 160 and outer cylindrical portion 120. Magnets 160 may be magnetized so that, for example, the outer curved surfaces of the respective magnets are south poles and the opposite inner curved surfaces are north poles. Accordingly, a magnetic field, of which one example is represented by an arrow 165 in FIG. 2, may be generated that is directed from magnets 160 toward the inner cylindrical portion 140. An electrically conducting coil (FIG. 3), which may be located in channel 150 and supplied with electric current may be subjected to a magnetic force along an axis by an interaction between the magnetic field of the permanent magnets and the magnetic field generated by the electric current flowing through the coil. Such an axis may align with an optical axis of a lens mechanically mounted with the coil, for example. Accordingly, such a lens may be displaced along an optical axis by a magnetic force, whose magnitude may vary with the amount of electrical current in the coil. Of course, such a configuration of magnets and coils is merely an example, and claimed subject matter is not so limited.

FIG. 3 is an exploded perspective view of a lens driving apparatus 300, according to an embodiment. Lens driving apparatus 300 may comprise a housing 305 at least partially enclosing actuation element portion 310 and frame portion 320, for example. Actuation element portion 310 may comprise yoke 330 that may include magnets 340 and at least two mutually non-contacting subtending yoke sections, such as yoke sections 110 shown in FIGS. 1 and 2. In the example shown in FIG. 3, four such yoke sections are employed. Actuation element portion 310 may also include a carrier such as a lens carrier 337 to hold a lens 335, for example. Frame portion 320 may comprise a variety of components such as an upper leaf spring 327, a lower leaf spring 326, a coil 322 including a hollow body portion and a flange portion, a spacer 324, base 328, and cover 329, just to name a few components. Of course, such a lens driving apparatus is merely an example, and claimed subject matter is not so limited. In a particular embodiment, yoke 330 may be adapted to accommodate coil 322 in a space within yoke sections, such as central area shown in FIGS. 1 and 2. Magnets 340 may be disposed on yoke sections 110, such as in channels 150 shown in FIGS. 1 and 2. Upper and lower leaf springs 326 and 327 may be employed to limit a range of motion and to provide a restoring force that counteracts a magnetic force with which the lens driving apparatus operates. Accordingly, upper and lower leaf springs 326 and 327 may comprise at least one elastic element to indirectly couple housing 305 and carrier 337. In another particular embodiment, an elastic element such as a spring (not shown) directly coupling housing 305 to carrier 337 may be used to provide a restoring force to counteract a magnetic force with which the lens driving apparatus operates. Coil 322 may comprise a winding of insulated conductive wire to carry an electrical current, as mentioned above. For example, coil 322 may be formed by multiple layers of windings to achieve a desired magnetic force for a particular current.

Figure 4:
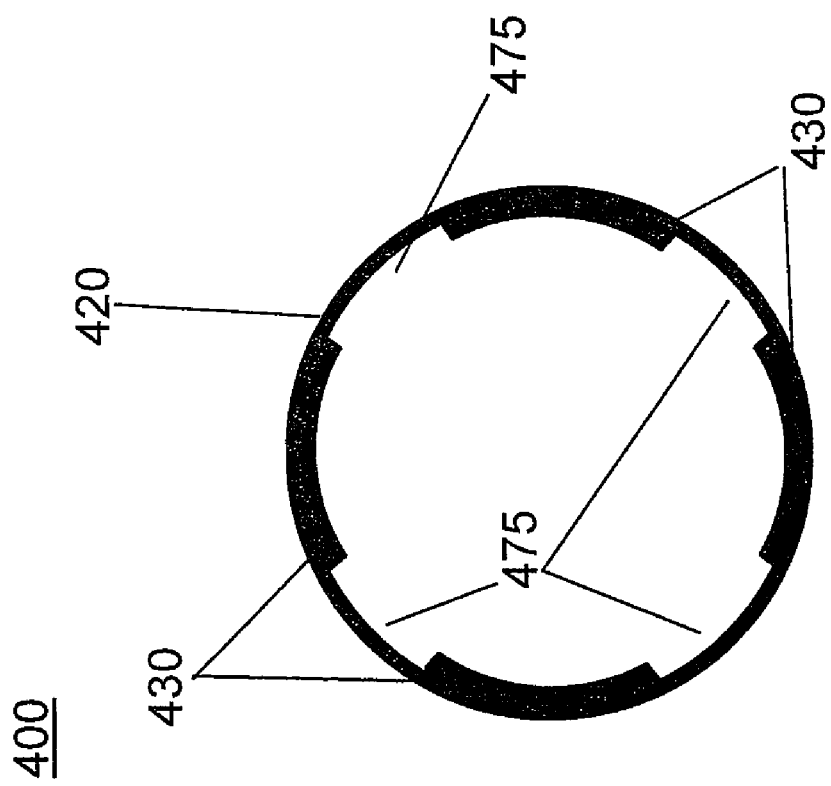
FIG. 4 is a plan view of a yoke attached to a casing, according to an embodiment.

In an embodiment, a yoke may be grown, such as by vapor deposition, on an inside perimeter of a casing used to contain a lens actuation device. Such a casing, for example, may be employed to contain lens actuation device 300 shown in FIG. 3. FIG. 4 is a plan view of a yoke attached to a casing 420. Such a yoke may comprise yoke sections 430 spaced apart by section gap 475. Although four such yoke sections are shown, two or more yoke sections may be employed. In a vapor deposition process, for example, circumferential portions of casing 420 may be masked where two or more section gaps 475 are to be located. Subsequently, the masked casing may be subjected to a vapor deposition process to grow a magnetically permeable material on a wall of the casing exposed by the masking. Next, masking may be removed to form section gaps 475 that separate individual yoke sections.

Figure 5:
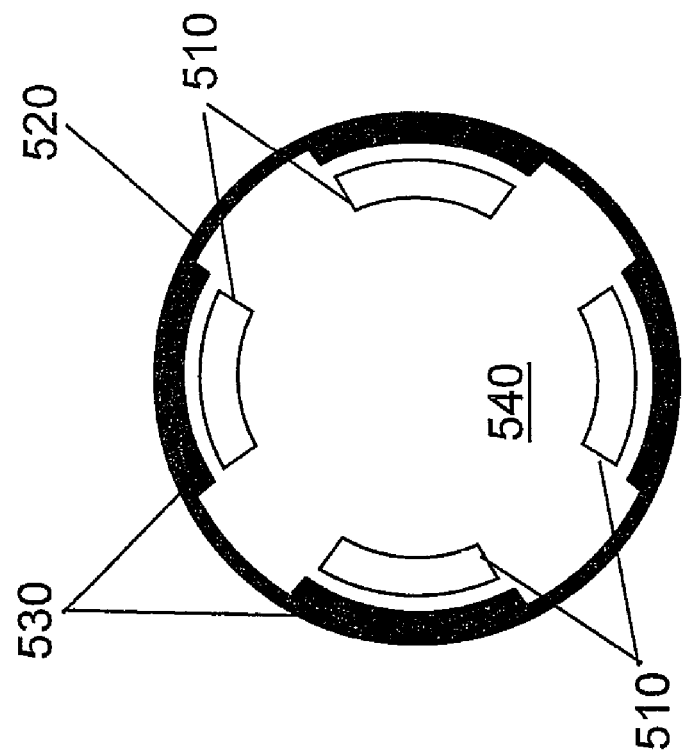
FIG. 5 is a plan view of the yoke-magnet assembly attached to a casing, according to an embodiment.

FIG. 5 is a plan view of a yoke-casing assembly 520, such as that shown in FIG. 4, according to an embodiment. Magnets 510, which may comprise permanent magnets, may be placed over yoke sections 530 by an adhesive and/or by mechanical means (not shown). An inner region 540, which may comprise space within yoke sections 530 and magnets 510, may be adapted to accommodate a coil, such as coil 322 shown in FIG. 3. In a particular embodiment, magnets 510 may be grown onto yoke sections 530 using vapor deposition. For example, a magnetic material may be grown to a desired thickness on exposed surfaces of yoke sections 530 by a vapor deposition process.

One skilled in the art will realize that a virtually unlimited number of variations to the above descriptions is possible, and that the examples and the accompanying figures are merely to illustrate one or more particular implementations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
arranging at least two mutually non-contacting yoke sections about a circumference of a lens to enable generation of a substantially uniform magnetic field within said yoke sections;
depositing a yoke material onto an inside perimeter of a case;
placing magnets onto said yoke material;
masking portions of said inside perimeter of said case using a masking material;
depositing said yoke material onto said inside perimeter of said case; and
removing said masking material to produce at least two mutually non-contacting subtending yoke sections.

2. The method of claim 1, further comprising:
bending and/or folding flat material to produce said yoke sections; and
placing a magnet in individual said yoke sections.

3. The method of claim 1, wherein said depositing said yoke material comprises vapor deposition of a magnetically permeable material.

4. The method of claim 1, wherein said yoke material comprises a magnetically permeable material.

5. The method of claim 1, further comprising arranging four mutually non-contacting yoke sections about said circumference of said lens.

6. An apparatus comprising:
means for arranging at least two mutually non-contacting yoke sections about a circumference of a lens to enable generation of a substantially uniform magnetic field within said yoke sections;
means for depositing a yoke material onto an inside perimeter of a case;
means for placing magnets onto said yoke material;
means for masking portions of said inside perimeter of said case using a masking material;
means for depositing said yoke material onto said inside perimeter of said case; and
means for removing said masking material to produce at least two mutually non-contacting subtending yoke sections.

7. The apparatus of claim 6, further comprising:
means for bending and/or folding flat material to produce said yoke sections; and
means for placing a magnet in individual said yoke sections.

8. The apparatus of claim 6, wherein said means for depositing said yoke material comprises vapor deposition of a magnetically permeable material.

9. The apparatus of claim 6, wherein said yoke material comprises a magnetically permeable material.

10. The apparatus of claim 6, further comprising arranging four mutually non-contacting yoke sections about said circumference of said lens.

* * * * *